United States Patent [19]

Colling

[11] Patent Number: 5,760,373
[45] Date of Patent: Jun. 2, 1998

[54] ENHANCED CONTACT AREA QUICK RELEASE MIG GUN TIP

[75] Inventor: Ronald W. Colling. Appleton, Wis.

[73] Assignee: Miller Electric Manufacturing Company. Appleton, Wis.

[21] Appl. No.: 579,123

[22] Filed: Dec. 27, 1995

[51] Int. Cl.⁶ ................................................ B23K 9/24
[52] U.S. Cl. .............................................. 219/137.61
[58] Field of Search ........................ 219/137.61, 136, 219/137.31, 137.2

[56] References Cited

U.S. PATENT DOCUMENTS

| | | |
|---|---|---|
| 2,666,832 | 1/1954 | Landis et al. |
| 2,761,049 | 8/1956 | McElrath et al. |
| 2,769,894 | 11/1956 | Rives . |
| 2,797,301 | 6/1957 | Copleston . |
| 2,808,498 | 10/1957 | Hudson et al. |
| 3,007,033 | 10/1961 | Newman et al. ............ 219/137.2 |
| 3,025,387 | 3/1962 | Kinney ........................ 219/137.61 |
| 3,143,633 | 8/1964 | Wadleigh . |
| 3,207,885 | 9/1965 | Riege . |
| 3,283,121 | 11/1966 | Bernard et al. |
| 3,428,778 | 2/1969 | Blackman et al. |
| 3,469,070 | 9/1969 | Bernard et al. |
| 3,514,570 | 5/1970 | Bernard et al. |
| 3,544,758 | 12/1970 | dal Molin . |
| 3,689,733 | 9/1972 | Matasovic . |
| 3,909,585 | 9/1975 | Sanders et al. |
| 4,250,366 | 2/1981 | Erickson et al. |
| 4,268,740 | 5/1981 | Sanders . |
| 4,282,419 | 8/1981 | Auer . |
| 4,297,561 | 10/1981 | Townsend et al. |
| 4,361,747 | 11/1982 | Le . |
| 4,403,136 | 9/1983 | Colman . |
| 4,482,797 | 11/1984 | Shiramizu et al. |
| 4,544,827 | 10/1985 | Cusick, III . |
| 4,554,432 | 11/1985 | Raloff . |
| 4,560,858 | 12/1985 | Manning . |
| 4,695,702 | 9/1987 | Gartland . |
| 4,702,539 | 10/1987 | Cusick, III et al. |
| 4,791,266 | 12/1988 | Gerard . |
| 4,864,099 | 9/1989 | Cusick, III et al. |
| 4,937,428 | 6/1990 | Yoshinaka et al. |
| 4,945,208 | 7/1990 | Lian . |
| 4,978,831 | 12/1990 | Lian . |
| 5,097,108 | 3/1992 | Hamal . |
| 5,338,917 | 8/1994 | Stuart et al. |
| 5,349,158 | 9/1994 | Mari . |
| 5,384,447 | 1/1995 | Raloff et al. |
| 5,440,100 | 8/1995 | Stuart et al. |

FOREIGN PATENT DOCUMENTS

| | | |
|---|---|---|
| 0 003 781 A1 | 2/1979 | European Pat. Off. |
| 758890 | 8/1954 | United Kingdom . |
| 1 237 912 | 6/1968 | United Kingdom . |
| 1 291 500 | 12/1969 | United Kingdom . |
| 1 385 255 | 9/1972 | United Kingdom . |

*Primary Examiner*—Clifford C. Shaw
*Attorney, Agent, or Firm*—Schwartz & Weinrieb

[57] ABSTRACT

A quick release mig gun tip comprises a contact tip having an exterior frusto-conical surface and external threads, and a gas diffuser having an internal frusto-conical surface and internal threads. The threads are preferably stub acme threads. The contact tip is assembled to the gas diffuser by engaging their threads until the frusto-conical surfaces mate. Large currents can be conducted through the frusto-conical surfaces and the threads without causing excessive resistance heating. The contact tip threads are designed so that assembly and release of the contact tip requires only one turn relative to the gas diffuser.

29 Claims, 2 Drawing Sheets

ENHANCED CONTACT AREA QUICK RELEASE MIG GUN TIP

BACKGROUND OF THE INVENTION

1. Field of the Invention

This invention pertains to arc welding, and more particularly to apparatus incorporated into the welding gun of wire welding machines.

2. Description of the Prior Art

In metal inert gas (mig) welding, the gun contact tip must satisfactorily perform two important functions. First, it must accurately guide the weld wire to the point of contact with the workpiece. Second, it must conduct adequate current, which can be as high as 400 amps and more, to the weld wire. To achieve those results, it is well known to provide a relatively long contact tip made of copper and having an axial hole therethrough. The hole is sized slightly larger than the diameter of the weld wire. The contact tip extends from a gas diffuser through which an inert gas is directed around the welding arc. Current to the contact tip is supplied to it through the gas diffuser.

Contact tips are particularly subject to at least two modes of failure. The first is burnback, which occurs if the feeding of weld wire through the contact tip is stopped while an arc is maintained. The second mode of failure is wearing of the through hole due to the abrasive nature of the weld wire material. In addition, because the contact tip is so close to the welding arc, and because the tip must carry high electrical currents, it becomes very hot. The high temperatures also have a deleterious effect on the contact tip, due in part because the hotter the tip becomes the softer it becomes, which makes it less resistant to wear from the weld wire.

Due to the severe operating conditions, contact tips have relatively short service lives. Consequently, they are treated as consumable items in the industry. Typically, contact tips are made as separate pieces that are threaded into the gas diffusers. When a contact tip has worn, it is threaded out of the gas diffuser and discarded, and a new one is screwed in place.

As noted above, in addition to the heating caused by the welding arc, another potential source of heat to the contact tip are the threads between it and the gas diffuser. That is, the threads can cause resistance heating. To minimize electrical resistance, the contact tip and gas diffuser threads have a relatively long engagement length and a fine pitch. A typical thread for prior contact tips and gas diffusers is 0.250–28 UNF with approximately 0.25 inches of axial engagement between the two parts.

However, the long engagement fine pitch thread presents a problem. Removing a worn contact tip from the gas diffuser requires several turns of the contact tip. For example, with 28 pitch threads, seven turns are necessary to produce 0.25 inches of axial movement for removal. If the weld wire has burned back and fused to the contact tip, the weld wire must twist through the same number of turns as the contact tip. The potential springback of the fully removed contact tip due to the twisted weld wire is annoying if not potentially dangerous. Moreover, the time required to disassemble the multiple turns also contribute to down time of the production area.

U.S. Pat. Nos. 5,338,917 and 5,440,100 show a welding gun in which a gas diffuser has a projection for contacting a channel of varying width in a contact tip. When installed together, the contact tip and gas diffuser contact each other at one point and along two lines. The total area of contact at the point and along the lines is quite small, thereby increasing the resistance heating produced by the welding current.

U.S. Pat. No. 2,761,049 shows a welding gun having a contactor tip received in and held by a cap nut to an elongated guide tube. There is a frusto-conical mating surface between the contactor tip and the guide tube. The contactor tip and cap nut are surrounded by a gas cup that is slidable along the guide tube. Replacing the contactor tip requires sliding the gas cup and turning the cap nut several turns both to remove the contactor tip and to install a new one. Because the cap nut is a separately removable piece, it is subject to loss or damage.

U.S. Pat. No. 2,808,498 shows an electrode contact tip buried deep in a welding gun. The weld wire emerges from the welding gun through a ceramic nozzle tip that is threaded into a water jacket. Replacement of the contact tip requires major disassembly and reassembly of the welding gun.

Thus, a need exists for improvements to the contact tips and gas diffusers of wire welding machines.

SUMMARY OF THE INVENTION

In accordance with the present invention, a quick release mig gun contact tip is provided that minimizes resistance heating between the contact tip and a gas diffuser. This is accomplished by fabricating the contact tip and the gas diffuser with simultaneously mating frusto-conical surfaces and stub threads, or other quick disconnecting mating engagement means.

The upstream end of the gas diffuser may be constructed to suit any desired weld wire gun handle. The various ports and passages for the shielding gas may also take any desired shape. The downstream end of the gas diffuser is fabricated with a frusto-conical interior surface having its apex end toward the gas diffuser upstream end. In the embodiment utilizing stub threads for the quick disconnecting engagement, the base end of the frusto-conical surface terminates in a stub thread having only a little more than one thread. The stub thread ends at the downstream edge of the gas diffuser.

The downstream end of the contact tip may be conventional. The upstream end is formed with a frusto-conical exterior surface of the same taper and diameters as the gas diffuser frusto-conical surface. The base end of the contact tip frusto-conical surface terminates in a stub thread that is the same as that of the gas diffuser. The contact tip stub thread has approximately a single turn of active thread.

With the contact tip assembled to the gas diffuser, the entire area of the frusto-conical surfaces of the two parts are in intimate facing contact with each other. In addition, the engaged areas of the threads of the two parts are in facing contact. The large areas of contact between the two parts enable them to handle heavy current with minimized resistance heating. Further, only one reverse turn of the contact tip is required to remove it from the gas diffuser when replacement is needed.

According to another aspect of the invention, the contact tip is manufactured very economically from polygon stock. The stock is extruded with a hexagon or similar external surface and with the weld wire hole. The downstream end of the contact tip is turned slightly to a cylindrical surface, leaving a portion of the hexagon surface for wrench flats. The stub threads are rolled up to the desired diameter, which is greater than the distance across opposing flats of the hexagon. The frusto-conical exterior surface is turned at the upstream end from the hexagon surface.

The method and apparatus of the invention, using mating frusto-conical surfaces and stub threads, thus conducts large currents without excessive heating. The stub threads conduct a significant portion of the current, even though they enable the contact tip to be removed from and replaced in the gas diffuser with a single turn.

BRIEF DESCRIPTION OF THE DRAWINGS

Other advantages, benefits, and features of the present invention will become apparent to those skilled in the art upon reading the following detailed description of the invention in conjunction with the drawings in which like reference characters designate like or corresponding parts throughout the several views, and wherein.

DETAILED DESCRIPTION OF THE ILLUSTRATED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
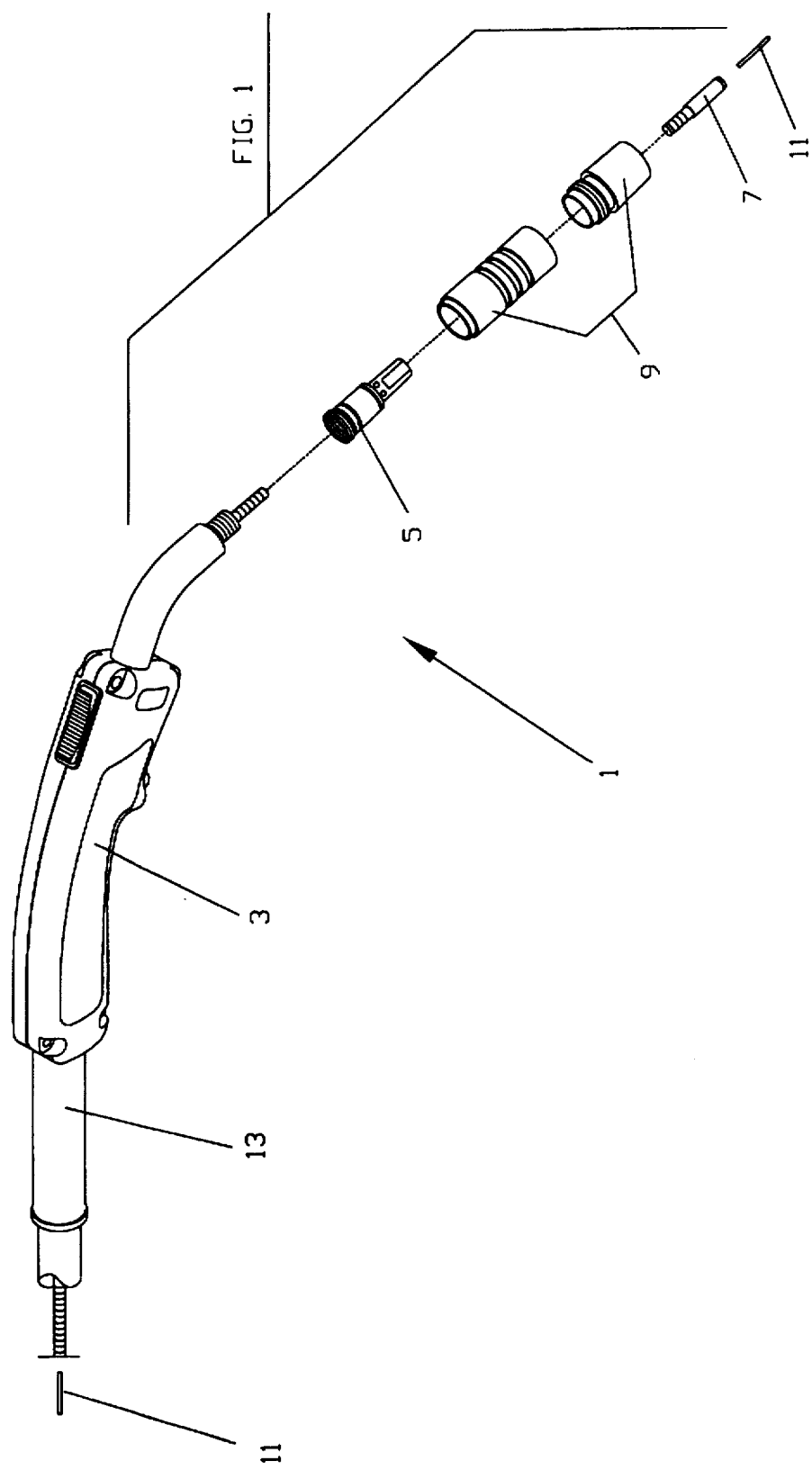
FIG. 1 is an exploded perspective view of a typical wire welding gun that includes the present invention.

Referring to FIG. 1, a typical wire welding gun 1 is illustrated that includes the present invention. The particular wire welding gun 1 shown is merely representative of a wide variety of guns that can advantageously employ the invention. The gun has a handle 3 to which is joined one end of a gas diffuser 5. A contact tip 7 is threaded to the other end of the gas diffuser 5. A nozzle 9, which is usually adjustable on the gas diffuser, surrounds the gas diffuser 5 and most of the contact tip 7. A long flexible weld wire 11 is fed to the handle 3 and the gas diffuser 5 and out the contact tip 7.

Electrical power is supplied to the gun 1 by cables represented at reference numeral 13. The power is conducted to the contact tip 7 by the gas diffuser 5, and from the contact tip 7 to the weld wire 11.

Figure 2:
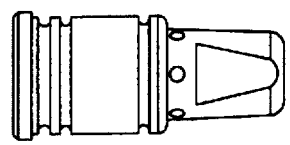
FIG. 2 is a side view of the gas diffuser of the present invention.
Figure 3:
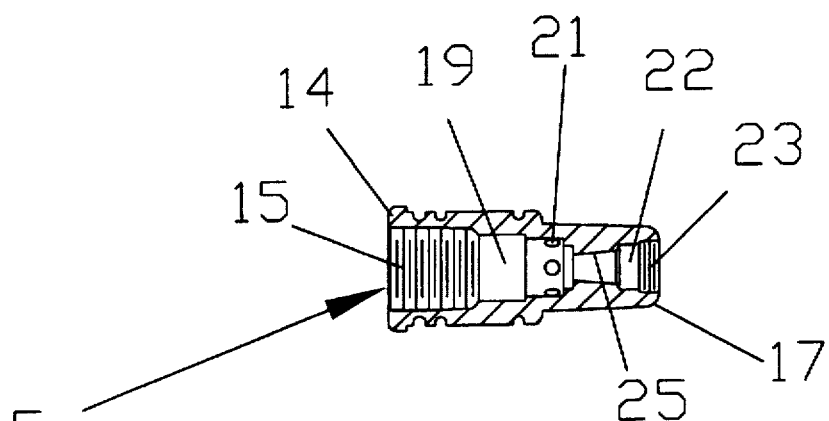
FIG. 3 is a longitudinal cross sectional view of the gas diffuser of FIG. 2.
Figure 4:
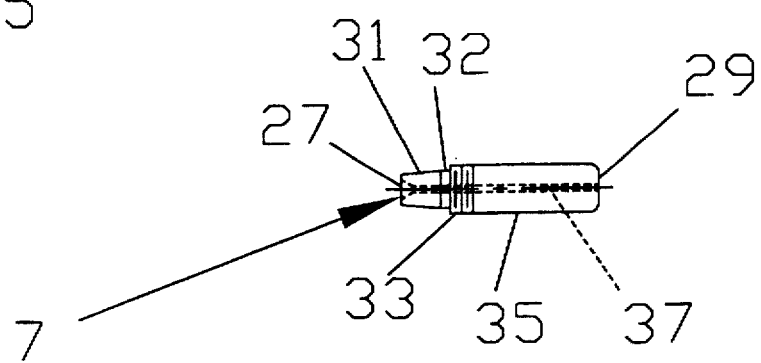
FIG. 4 is a side view on an enlarged scale of the contact tip of the invention.

In accordance with the present invention, the gas diffuser 5 and contact tip 7 are designed to provide a quick release therebetween while conducting maximum current to the weld wire 11. In one embodiment, a bayonet connection in combination with mating frusto-conical surfaces is used. In the embodiment shown in FIGS. 2–4, the gas diffuser 5 is generally tubular in shape, having an upstream end 14, a downstream end 17, and an axial passage 19. Internal threads 15 extend in the axial passage 19 from the upstream end 14. The threads 15 join with similar threads on the gun handle 3. Radial holes 21 pass through the wall of the gas diffuser 5 from the axial passage 19.

The axial passage 19 includes a tap hole 22 near the downstream end 17 of the diffuser 5. An internal stub thread 23 is machined into the tap hole 22. I have found that a 0.313-14 stub acme thread works very well. Preferably, the stub thread 23 has approximately 1.5 threads.

The tap hole 22 terminates at the base end 6f an interior frusto-conical surface 25 that is also part of the axial passage 19 such that the tap hole 22 as illustrated defines a transitional region between the thread 23 and the frusto-conical surface 25. The apex end of the frusto-conical surface 25 is located in the vicinity of the radial holes 21. An included angle of approximately ten degrees for the interior frusto-conical surface works very well.

The contact tip 7 has an upstream end 27 and a downstream end 29. A hole 37 extends axially through the interior of the contact tip 7 for its entire length. The contact tip 7 defines an exterior frusto-conical surface 31 at the upstream end 27 that has the same taper and diameters as the gas diffuser interior frusto-conical surface 25. At the base end of the contact tip frusto-conical surface 31 is a cylindrical surface 32 having a diameter slightly less than the diameter of the gas diffuser tap hole 22. The cylindrical surface 32 terminates in an external stub thread 33 and serves as a transitional region between the thread 33 and the frusto-conical surface 31. The contact tip stub thread 33 has the same diameter and pitch as the gas diffuser stub thread 23.

A working end 35 of the contact tip 7 extends from the stub thread 33 to the downstream end 29. The working end 35 may have a cylindrical surface as shown, a frusto-conical surface, or a combination of a cylindrical and frusto-conical surface. If desired, wrenching flats, not shown, can be formed on the working end of a cylindrical version.

The gas diffuser 5 and contact tip 7 are used by permanently screwing the threads 15 of the gas diffuser 5 to corresponding threads on the gun handle 3. The frusto-conical surface 31 of the contact tip 7 is inserted into the tap hole 22 and the frusto-conical surface 25 of the gas diffuser 5 until the contact tip threads 33 contact the gas diffuser threads 23. The initial angular orientation between the contact tip 7 and the gas diffuser 5 is relatively unimportant. The contact tip 7 is then turned until the external stub thread 33 thereon engages the gas diffuser internal stub thread 23. The contact tip 7 is further turned until the frusto-conical surface 31 thereon comes into contact with the gas diffuser frusto-conical surface 25. The stub threads 23, 33 and frusto-conical surfaces 25, 31 of the two parts 5, 7 are so dimensioned that the two frusto-conical surfaces 25, 31 mate after approximately one turn of the contact tip 7 in the gas diffuser 5, after their threads 23, 33 have initially engaged, and before the contact tip stub thread 33 has reached the end of the gas diffuser stub thread 23. That is, the contact tip stub thread 33 has approximately one turn of active thread, and the turning of the contact tip 7 into the gas diffuser 5 is limited by the contact between the frusto-conical surfaces 23, 33 and not by the contact tip thread 33 bottoming on the gas diffuser thread 23.

With the contact tip 7 assembled to the gas diffuser 5, the weld wire 11 can be fed through the gas diffuser passage 19 and to the contact tip hole 37. Considerable current can be conducted to the weld wire 11 by the gas diffuser 5 and contact tip 7 because of the large area of contact between the two parts 25 provided by the mating frusto-conical surfaces 25 and 31. The stub threads 23 and 33 provide significant additional area of contact. Consequently, resistance heating in and between the parts during operation of the gun 1 is minimal.

When it is necessary to remove a spent contact tip 7, a single reverse turn is sufficient to release it from the gas diffuser 5. Twisting of a weld wire 11 burnt onto the contact tip 7 is thus limited to one turn. The axial movement corresponding to the single turn of the contact tip 7 is only approximately 0.07 inches. Similarly, a new contact tip 7 is assembled to the gas diffuser 5 with a single turn. The entire replacement process is accomplished with very little downtime.

A further advantage of the gun tip of the invention is the increased strength, as measured by thread stretch under torque, of the stub acme threads 23 and 33 compared with prior UNF threads. The possibility of damage to the stub threads 23, 33 during the replacement process is thus reduced.

An unexpected benefit of the stub acme threads 23 and 33 coupled with the mating frusto-conical surfaces 25 and 31 is the increased torque retention they provide between the contact tip 7 and the gas diffuser 5 compared with prior quick release designs. The likelihood of the contact tip 7 working loose from the gas diffuser 5 during welding operations is therefore reduced. Also, the heating and cooling cycles inherent in the welding process may cause permanent interference between mating UNF threads of prior designs. This problem does not exist in the stub thread design of the present invention.

Figure 5:
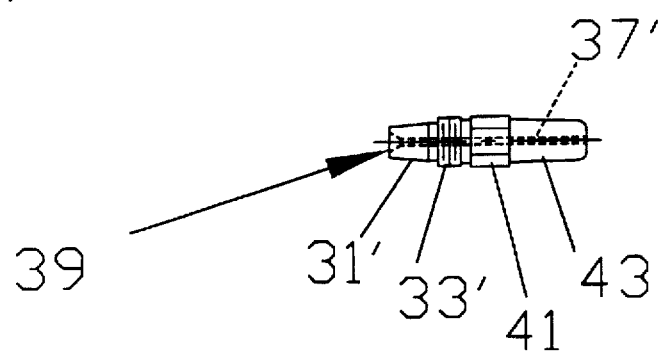
FIG. 5 is a side view of a modified embodiment of the contact tip.

Further in accordance with the present invention, in one embodiment the contact tip lends itself to be manufactured by an economical process. Turning to FIG. 5, a contact tip 7' is manufactured from a length of an extrusion of copper material having an hexagon periphery 41 and a through hole 37'. The working end of the contact tip 7' is turned to a cylindrical surface 43, leaving a portion of the hexagon periphery 41 as wrench flats. The stub threads 33' are rolled up from the smaller hexagon periphery to the 0.313 inches diameter of the threads 33'. The frusto-conical surface 31' is also turned from the hexagon periphery. The design of the contact tip 7' allows the greatest economy for material stock size.

Thus, it is apparent that there has been provided, in accordance with the invention, an enhanced contact area quick release mig gun tip that fully satisfies the aims and advantages set forth above. While the invention has been described in conjunction with specific embodiments thereof, it is evident that many alternatives, modifications, and variations will be apparent to those skilled in the art in light of the foregoing description. For example, a bayonet connection rather than stub threads can be used for the quick release tip. Accordingly, it is intended to embrace all such alternatives, modifications, and variations as fall within the spirit and broad scope of the appended claims.

I claim:

1. A quick release mig gun tip, comprising:
   an elongate contact tip having first and second ends;
   a hole extending between said first and second ends for accommodating a weld wire;
   an external frusto-conical surface, having an apex end at said first end of said elongate contact tip and a base end, for establishing surface-to-surface electrical contact with a mating frusto-conical surface of a gas diffuser;
   quick disconnect means for assembling said elongate contact tip to a gas diffuser;
   a non-threaded transitional region interposed between said external frusto-conical surface and said quick disconnect means; and
   a working end at said second end of said elongate contact tip.

2. The quick release mig gun tip of claim 1, wherein, said quick disconnect means comprises thread means; and said working end of said contact tip extends between said thread means and said second end of said contact tip.

3. The quick release mig gun tip of claim 2 wherein the thread means is a stub acme thread.

4. The quick release mig gun tip of claim 3 wherein the stub acme thread has approximately one turn of active thread.

5. A mig wire welding gun comprising:
   a handle;
   a gas diffuser joined to said handle and defining an internal frusto-conical surface having an apex end and a base ends an internal thread, and a non-threaded transitional region interposed between said frusto-conical surface base end and said internal thread; and
   a contact tip assembled to the gas diffuser and defining an external frusto-conical surface, having an apex end and a base ends mating with said internal frusto-conical surface of said gas diffuser for establishing surface-to-surface electrical contact with said internal frusto-conical surface of said gas diffuser, an external thread engaging said internal thread of said gas diffuser, and a non-threaded transitional region interposed between said base end of said external frusto-conical surface and said external thread.

6. The welding gun of claim 5, wherein:
   said internal and external threads of said gas diffuser and said contact tip are stub acme threads.

7. The welding gun of claim 5, wherein:
   said threads and said frusto-conical surfaces of said contact tip and said gas diffuser are so dimensioned that said frusto-conical surfaces mate after one revolution of said contact tip within said gas diffuser, in a first direction, after said threads of said contact tip and said gas diffuser have initially engaged, and before said thread of said contact tip has reached the end of said thread of said gas diffuser, so that said contact tip can be released from said gas diffuser by rotating said contact tip one revolution in a second reverse direction.

8. The welding gun of claim 5 wherein the thread of the gas diffuser has approximately 1.5 threads, and wherein the thread of the contact tip has approximately one turn of active thread.

9. A gas diffuser for use within a mig wire welding gun, comprising:
   a housing having first and second ends;
   a passage extending between said first and second ends of said housing for accommodating a weld wire;
   a first thread defined within said first end of said housing for mounting said gas diffuser upon a welding gun;
   internal threads defined within said passage at said second end of said housing for mating with a mid gun contact tip;
   an internal frusto-conical surfaces having an apex end and a base end, interposed between said first thread and said internal threads for establishing surface-to-surface electrical contact with a mating frusto-conical surface of a mig gun contact tip; and
   a non-threaded transitional region interposed between said internal threads and said internal frusto-conical surface.

10. The article of manufacture of claim 9 wherein the internal threads are stub acme threads.

11. The article of manufacture of claim 10 wherein the threads have approximately 1.5 threads.

12. A mig wire welding guns comprising:
   handle means for conducting electrical power from a source of electrical power;
   diffuser means joined to said handle for conducting said electrical power from said handle means and comprising an internal frusto-conical surface having an apex end and a base end, an internal thread, and a non-threaded transitional region interposed between said frusto-conical surface base end and said internal thread;

tip means comprising an external frusto-conical surface, having an apex end and a base end, mating with said internal frusto-conical surface of said gas diffuser for establishing surface-to-surface electrical contact with said internal frusto-conical surface of said gas diffuser, external thread means for mating with said internal thread of said diffuser means and undergoing one turn relative to said diffuser means so as to quickly assemble said tip means into electrical contact with said diffuser means and to quickly release said tip means from said diffuser means, and a non-threaded transitional region interposed between said base end of said external frusto-conical surface and said external thread means; and wire means fed through said handle means, said diffuser means, and said tip means for conducting said electrical power from said tip means to a workpiece.

13. The mig wire welding gun of claim 12, wherein:

said diffuser means comprises a gas diffuser having a first end joined to said handle means, a second end, and a passage extending between said first and second ends for accommodating said wire means; and said tip means comprises a contact tip having an axial hole therethrough that surrounds said wire means.

14. The mig wire welding gun of claim 12, wherein:

said internal thread of said diffuser means and said external thread of said tip means are acme stub threads whereby electrical power can conducted from said gas diffuser to said contact tip by the engaged threads with minimal resistance heating.

15. The mig wire welding gun of claim 12, wherein:

said thread of diffuser means has approximately 1.50 threads; and said thread of said tip means has substantially one turn of active thread.

16. A method of conducting electrical power within a mig wire welding guns comprising the steps of:

providing a gas diffuser having an internal frusto-conical surface and internal threads;

providing a contact tip having an external frusto-conical surface and external threads;

inserting said external frusto-conical surface of said contact tip into said internal frusto-conical surface of said gas diffuser such that surface-to-surface contact is established between said frusto-conical surfaces of said gas diffuser and said contact tip and said external threads of said contact tip contact said internal threads of said gas diffuser;

turning said contact tip relative to said gas diffuser such that said external threads of said contact tip undergo one revolution with respect to said internal threads of said gas diffuser and thereby threadedly engage said internal threads of said gas diffuser; and conducting electrical power from said gas diffuser to said contact tip through said mating frusto-conical surfaces and said engaged threads of said gas diffuser and said contact tip.

17. The method of claim 16, further comprising the step of:

turning said contact tip one reverse turn so as to thereby release said contact tip from said gas diffuser.

18. A method of manufacturing a contact tip for a wire welding gun comprising the steps of:

a. extruding a piece of conductive material having a polygon periphery and a longitudinally extending hole therethrough;

b. turning a first portion of the polygon periphery into a cylindrical surface at one end of the piece;

c. turning a second portion of the polygon periphery into an exterior frusto-conical surface at the second end of the piece; and d. rolling up threads from the polygon periphery adjacent the exterior frusto-conical surface.

19. The method of claim 18 wherein the step of rolling up threads comprises the step of rolling up an acme stub thread.

20. The method of claim 19 wherein the step of rolling up an acme stub thread comprises the step of rolling up an acme stub thread having approximately one turn of active thread.

21. A quick release mig gun tip, comprising:

an elongate contact tip having first and second ends with a hole extending between said first and second ends for accommodating a weld wire;

an external frusto-conical surface, having an apex end disposed at said first end of said elongate contact tip and a base end, for establishing surface-to-surface electrical contact with a mating frusto-conical surface of a gas diffuser; and quick disconnect means, comprising thread means of approximately one turn of active thread, and interposed between said base end of said external frusto-conical surface and said second end of said elongate contact tip, for engaging a thread of a gas diffuser so as to assemble said elongate contact tip to a gas diffuser.

22. The mig gun tip as set forth in claim 21, wherein:

said thread means of said mig gun tip comprises an acme stub thread.

23. A mig gun tip, comprising:

an elongate contact tip having first and second ends;

a hole extending between said first and second ends for accommodating a weld wire;

an external frusto-conical surface, having an apex end at said first end of said elongate contact tip and a base end, for establishing surface-to-surface electrical contact with a mating frusto-conical surface of a gas diffuser;

thread means for assembling said elongate contact tip to a gas diffuser;

a non-threaded transitional region interposed between said external frusto-conical surface and said thread means; and a working end at said second end of said elongate contact tip.

24. The mig gun tip as set forth in claim 23, wherein:

said thread means of said mig gun tip comprises an acme stub thread.

25. The quick release mig gun diffuser as set forth in claim 24, wherein:

said thread means of said quick disconnect means comprises an acme stub thread.

26. A quick release mig gun gas diffuser, comprising:

a housing having first and second ends with a hole extending between said first and second ends for accommodating a weld wire;

a first thread defined within said first end of said housing for mounting said mig gun gas diffuser upon a welding gun;

an internal frusto-conical surface, having an apex end and a base end, for establishing surface-to-surface electrical contact with a mating frusto-conical surface of a mig gun contact tip; and quick disconnect means, comprising thread means of approximately 1.50 threads, and disposed at said second end of said housing, for engaging a thread of a mig gun contact tip so as to quickly assemble and disassemble said mig gun gas diffuser with respect to a mig gun contact tip.

27. A quick disconnect gas diffuser for use within a mig wire welding gun, comprising:

a housing having first and second ends;

a passage extending between said first and second ends of said housing for accommodating a weld wire;

a first thread defined within said first end of said housing for mounting said gas diffuser upon a welding gun;

quick disconnect means defined within said passage at said second end of said housing for mating with a mig gun contact tip;

an internal frusto-conical surface, having an apex end and a base end, interposed between said first thread and said quick disconnect means for establishing surface-to-surface electrical contact with a mating frusto-conical surface of a mig gun contact tip; and a non-threaded transitional region interposed between said quick disconnect means and said internal frusto-conical surface.

28. The gas diffuser as set forth in claim 27, wherein:

said quick disconnect means comprises thread means of approximately 1.50 threads.

29. The gas diffuser as set forth in claim 28, wherein:

said thread means of said quick disconnect means comprises an acme stub thread.

* * * * *